Figure 1:
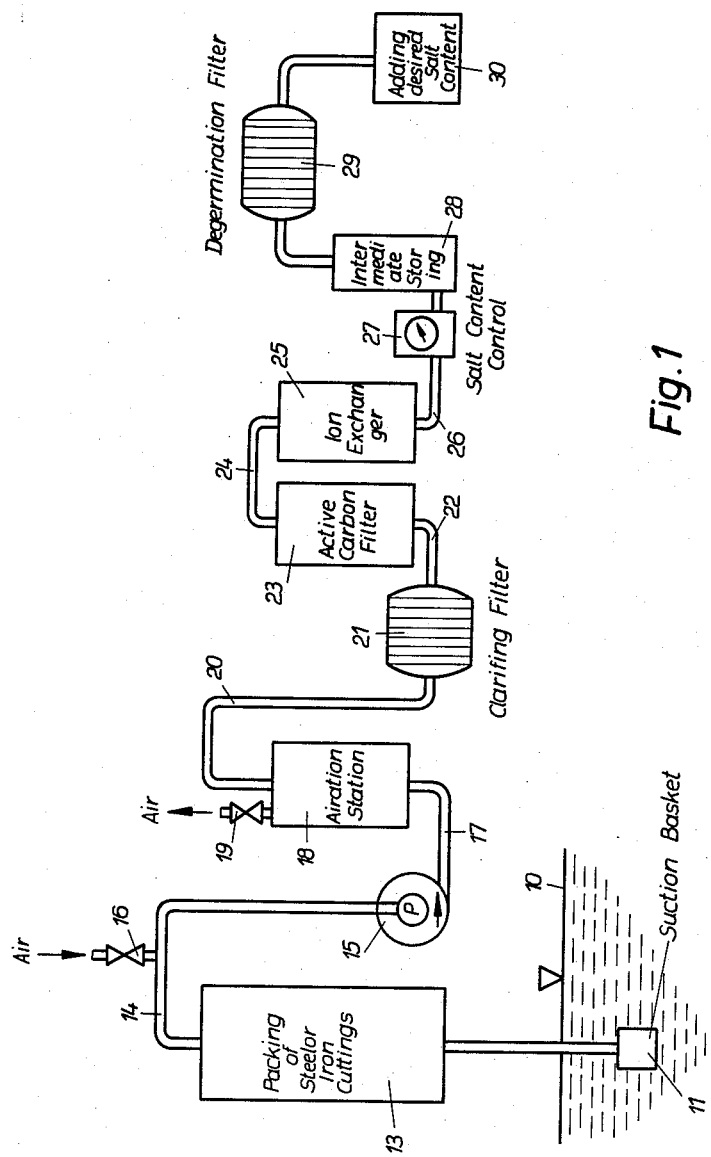

Jan. 21, 1964  E. REINHARDT  3,118,833
PLANT AND PROCESS FOR WATER PURIFICATION
Filed July 2, 1958  2 Sheets-Sheet 1

Inventor
ERICH REINHARDT

Jan. 21, 1964     E. REINHARDT     3,118,833
PLANT AND PROCESS FOR WATER PURIFICATION
Filed July 2, 1958     2 Sheets-Sheet 2

Inventor
ERICH REINHARDT

United States Patent Office 3,118,833
Patented Jan. 21, 1964

3,118,833
PLANT AND PROCESS FOR WATER
PURIFICATION
Erich Reinhardt, Bad Kreuznach, Rhineland, Germany,
assignor to Seitz-Werke G.m.b.H., Bad Kreuznach,
Germany
Filed July 2, 1958, Ser. No. 746,188
Claims priority, application Germany July 5, 1957
4 Claims. (Cl. 210—151)

This invention relates to water purification, and more particularly to processes and plants for recovering water for general use, from contaminated water, more especially surface water, by precipitation of substances contained in the water in a finely divided state, and subsequent filtration of the material precipitated.

It is well known in this art to add to the water precipitants in the form of metal salt solutions such as iron chloride or aluminum compounds, for example, to precipitate the colloids contained in the water. This method, however, involves the drawback that the addition of metal salt solutions depends on the nature of the water treated, as e.g. the salt content (degree of hardness), the temperature, the pH-value, and the alkalinity, and on a commercial scale at least, these factors which should determine the amount to be added, can not be taken into account adequately and correctly, at least not in the absence of cumbersome analyses. On the other hand, if the amount of the substances to be added is increased for safety's sake, this has the disadvantage that the filters used to separate the precipitated colloids clog very rapidly so as to be rendered unusable. This is particularly true if filtering materials comprising a deposit of fibrous or granular substances are used which due to their finely porous structure, clog very quickly. Even if the addition of precipitants corresponds accurately to the nature of the water, and a strong flocculation occurs, it is still true that the colloids precipitated in this manner clog the filters of the type mentioned above relatively rapidly. The cake collected on the filter layers has little permeability, and with this kind of flocculation, the interior of the filtering medium clogs rapidly so that the life of the filter is quite inadequate.

It is an object of the present invention to eliminate the various drawbacks of prior art methods mentioned above, and to provide improved processes and plants which are vastly more efficient.

It is a further object of the present invention to provide processes and plants which are particularly suitable for the treatment of water containing radioactive fission products.

Other objects, and the manner in which the same are attained, will become apparent as this specification proceeds.

I have discovered that particularly favorable results with respect to flocculation and the effectiveness of an added layer filter, are obtained if water containing coarsely or finely dispersed impurities, is passed, prior to the fine filtration by a layer filter, through a packing or fill of metallic chips. In the course of passage through loosely packed metal chips, not only the coarse impurities of the water are retained, but, most surprisingly, also a very large portion of the most finely dispersed substances causing turbidity. When iron chips are used, a coating of ferric hydroxide is formed on the chips corresponding to the oxygen content of the water. At the same time, bivalent iron dissolves whose partly oxidized hydrolysis product is obtained not in the form of coarse flocks, but of a finely dispersed but well filterable ferric hydroxide sol.

In line with this discovery, the invention contemplates passing the contaminated water, prior to its entry into a layer filter, across meal chips or metal wool. For the metal chips, more or less fine steel cuttings may be used. The steel cuttings may be subjected to some preparatory treatment such as a partial coppering whereby the separation of solids is enhanced. Instead of steel cuttings, aluminum chips may be used which preferably are cauterized with traces of mercury or mercury compounds to prolong their effectiveness.

The present method is quite independent from the state of the untreated water, and requires no preliminary determination of the constituents of the untreated water, such as the salt content, for the purpose of determining the quantity of a precipitant to be added. In consequence, the present method requires no skilled operators. The plant involves a container filled with metal chips or metal wool, which is installed in the suction conduit of a conveying system. In order to influence the degree of precipitation and to ensure a conversion of the iron (II) hydroxide into iron (III) hydroxide, a ventilator must be installed in the pump pressure conduit, the aeration of the water being effected simply by a shifting valve arranged in the suction conduit, whereby the necessary air supply can be controlled conveniently and the need for compressed air, and thus for a compressor system, is eliminated. The degree of dispersion of the flocculation can be so readily controlled by means of the ventilation system that with an adequate precipitation, the life of the added filter is extended to a maximum. The flocculation obtained in this manner has a fine degree of dispersion compared with the conventional coarse flocculation. The layer of mud or mire precipitated on the filter layers is not dense and impermeable as in other flocculation processes, but porous to a far reaching extent so that the muddy layer is imparted a filtering capacity of its own. Moreover, the colloidal particles are far less apt to clog the inner texture of the filter layers than conditions prevailing with the conventional precipitation methods would have warranted to expect.

As the added filter, a layer filter is preferred, the filter layers comprising a mixture of organic and inorganic fibers or granular substances which are specially loosened up by corresponding control of their manufacture, such mixture being composed preferably of more than about 20% asbestos and up to about 20% diatomaceous earth, while the remainder is formed of cellulose fibers. This filter layer composition is distinguished by a particular depth effect, and prevailing electrical charges and electric osmosis within the layer prepared as noted above, may be referred to as the factors responsible for the particular activity of the filter layer with respect to most finely dispersed substances. These filter layers may be used either in the form of ready-made boards or else they may be produced in the filter itself, by the deposit of a suitable mixture. If the filtering step were preceded by a conventional precipitation method involving the addition of metal salt solutions, due to the drawbacks mentioned above the present filter layers would not be suitable for filtering finely dispersed substances as the excess of precipitation would soon saturate the effective electrical charge, and the electric osmosis would come to an end very rapidly.

In the prior art, it has been suggested to pass impure water first through steel wool and subsequently, through an ion exchanger. This method, however, serves the purpose of retaining in the steel wool a part of the radio-active fission products contained in the water so as to relieve the ion exchanger to some extent. There has been no suggestion, however, as to subsequent fine filtration, nor has it been recognized that the passage of the dirty water through steel wool and through layer filters of a specific kind, would result in particularly advantageous effects.

The present method has particular advantages in the treatment of water containing radio-active fission products.

The present invention, also, uses ion exchangers designed to remove the fission products from the water. The effectiveness of these exchangers, however, is dependent on the amount of salt present in the water, and on a far reaching preliminary purification. The already particularly fine preliminary filtration provided for by the present invention, serves to remove from the water such burdens as colloidal or coarsely dispersed substances, with the result that the ion exchanger passed subsequently, is already relieved and in consequence, retains its effectiveness over a very long period. Moreover, the present preliminary filtering step avoids introducing additional foreign ions into the water as is inevitable, to a far reaching extent, in connection with the conventional precipitation processes. In the absence of a preliminary purification as provided for by the present invention, the use of an ion exchanger would serve no useful purpose. Moreover, the filter layers which follow the steel wool containing receptacle, retain already a high percentage of the radio-active substances, in contrast to other filtration methods using e.g. diatomaceous earth as a filtering agent, where this is not the case.

The ion exchanger has the effect of freeing the water from salts, and this effect is used, in a further elaboration of the present invention, to determine indirectly the exhaustion of the exchanger with respect to radio-active fission products and thus the time up to which the water recovered can be used without any risk, for service or drinking purposes. For this purpose, a measuring instrument indicating the salt content is provided at a point following the ion exchanger as far as the passage of water is concerned. If the salt content exceeds a certain amount, the ion exchanger is exhausted, and the passage of radio-active fission products is to be reckoned with; in consequence, from this moment on the filtration must be stopped. It is well known that reliable measurements of the radiation intensity in running water are possible only if complex devices and careful attendance are resorted to, and such instruments are impracticable particularly in the case of portable water purification plants, whereas a simple measuring instrument indicating the salt content, such as a conductivity meter, requires no such complex installations or skilled and continuous attendance.

The water discharged at the outlet of the ion exchanger is free from impurities of all kinds including radio-active fission products, but is not yet free from germs, or sterile, although the germ content has been lowered to a far reacting extent. Consequently, the invention provides, as the next following stage, a degermination layer filter which retains the bacteria and the other smallest living organisms. I have found that a filter layer composed or organic and inorganic fibers, with an asbestos content exceeding 20% has the property of retaining small traces of radio-active constituents so that this filter offers additional security in the event of the ion exchanger being overburdened. I have further found that the provision, ahead of the degermination filter, of an ion exchanger freeing the water from salt to a far reaching extent, has the effect, as far as the degermination filter of the kind mentioned above is concerned, for the same degree of porosity, to extend its separation capacity to still smaller particles than before. In such an ultra-pure water, for example, viruses are retained which otherwise would pass the filter. Manifestly, the low content of foreign and solvent constituents impedes any rapid saturation of the adsorption forces within the filter structure which thus are activated relative to the smallest particles, it being understood that the adsorption forces required for retaining particles within the structure of a degermination filter, are required to be disproportionately stronger if they are to be effective with respect to smallest particles. The presence of solid and soluble constituents so disturbs the interfacial effect otherwise favorable for the filtering effect that the active range of the filter is limited to coarser constituents only. In view of this recognition, one aspect of the present concept in which invention is believed to reside, involves the provision of a salt removing material ahead of the degermination filter, for the purpose of enhancing the filtering effect of the degermination filter.

In the drawing accompanying the present specification and forming part thereof, an embodiment of the invention is shown diagrammatically by way of example.

Figure 2:
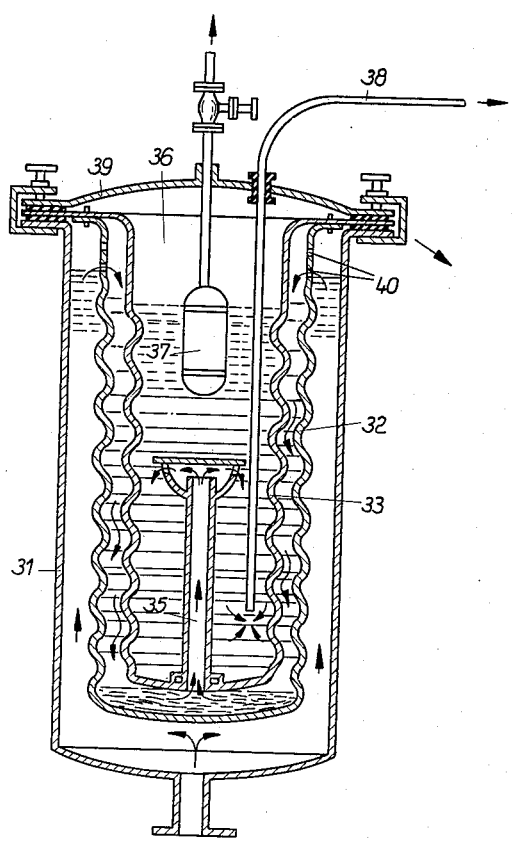
Figure 3:
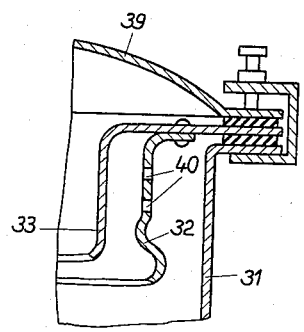

In the drawing,

FIG. 1 shows diagrammatically a water purification plant according to the invention, FIG. 2 shows, in section, an oxidation tank forming part of the installation of FIG. 1, drawn to a larger scale, and FIG. 3 shows in enlarged sectional view, a fragmentary detail of the upper right hand portion of the whole view of FIG. 2, the enlargement of the scale of FIG. 3 being greater than that of FIG. 2.

Referring now to FIG. 1 of the drawing, the liquid level or surface of the water is indicated at 10. A suction basket 11 is immersed in the impure water which, through a conduit 12, is passed into a tank 13 which is charged with steel wool. By means of a distribution system (not shown in the drawing), the water is passed across the entire section of the steel wool, to be then conveyed, through a suction conduit 14, to a conveyor pump 15. In the section conduit 14, a snifting valve 16 is provided whereby air is drawn in which enters the current of water once it leaves the tank 13. The pressure conduit 17 of the pump enters, at the bottom, a tank 18 wherein the oxidation takes place. The tank 18 is provided with a vent valve 19, and a conduit 20 leading to a clarifying filter 21. The clarifying filter 21 is charged with filter layers consisting of a deposit of fibers and granular organic and inorganic substances. After leaving the layer filter 21, the water is passed through a conduit 22 into a tower 23 filled with active carbon, and from here through a conduit 24 to an ion exchanger 25. The water leaves the ion exchanger through a conduit 26 and enters a measuring instrument 27 wherein the salt content of the water is determined. Through a further container 28, the water is passed into a degermination layer filter 29 and from here into a container 30 wherein to the salt-free water, a suitable amount of salt is added in order to render the water acceptable for human consumption.

This plant operates as follows:

The suction basket 11 serves for effecting a coarse preliminary purification of the water, and in the tank 13, the not yet aerated water adsorbs bivalent iron from the steel wool, the steel wool effecting, at the same time, a further preliminary filtration accompanied by adsorption of part of the ions and colloids present. The contaminated water may contain noxious germs as well as toxic substances and radio-active fission products. In the suction conduit 14, the water is aerated so as to supply oxygen, and in the oxidation tank 18 ferric hydroxide is formed so as to effect precipitation and flocculation of the colloids contained in the water. The effectiveness of the oxidation and consequently, also the flocculation can be adjusted by a corresponding variation and control of the supply of air dependent on the varying characteristics of the water treated. The water stays long enough in the oxidation tank 18 to ensure a most effective flocculation. The major portion of the colloidal constituents is thus flocculated and separated in the clarification filter 21. The clarification filter 21, owing to the highly effective flocculation, has a very long life; moreover, because of its structural characteristics, it is effective even with respect to the smallest particles of radio-active fission products. After passage through the carbon filter which is designed to retain chiefly taste- or smell-affecting substances as well as toxic substances such as chemical warfare agents, for example, but which also retains some radio-active fission products, the water passes into the ion exchanger 25. In this ion exchanger, any radio-active fission products still contained in the water are retained, whereby the last remnants of the constituents of this kind originally contained in the water are removed. It is necessary, however, that this last remnant is removed if the water was contaminated radio-actively, in order to render the drinking water recovered, suitable for human consumption which requires the reduction of radio-active fission products below the limits where these could be harmful. When the measuring instrument 27 indicates that the salt content of the water exceeds a certain value, it may be assumed that the ion exchanger is exhausted. This implies that it is no longer sufficiently adsorptive with respect to radio-active fission products so the filtration must be interrupted, which may be effected in a manner such that the instrument is used as an impulse sender for an automatic cut-off device. The substantially salt-free water is then filtered in the degermination filter 29 so as to remove all bacteria and other smallest living organisms. In view of the fact that the water is practically free from salts and metal ions, the filtering effect in the degermination filter is enhanced with respect to particularly small constituents such as viruses. On leaving the degermination filter, salt may be added to the water in the tank 30.

Referring now to FIGS. 2 and 3 of the drawing, the oxidation tank consists of a jacket 31 wherein two corrugated containers 32 and 33 are inserted. The water is introduced through the inlet 34 disposed in the bottom of the tank 31 and rises in the annular space between the casing of tank 31 and the outer container 32. The water enters the middle annular chamber disposed as the intermediate chamber structure between the outer container 32 and the inner container 33 through openings 40 and an enlargement in section of this arrangement is shown in FIGS. 2 and 3. In this annular chamber, the water trickles down along the interior surface of the corrugated side wall of the outer container 32 and along the exterior surface of the corrugated side wall of the inner container 33 to rise through the centrally disposed riser member 35 into the interior of the inner container 33. In this oxidation tank, and particularly in the annular chamber intermediately disposed between containers 32 and 33, the water has the opportunity to absorb oxygen from the air carried along by the water, in an amount substantially sufficient to oxidize the remaining bivalent iron which is present in the water to produce by such oxidation finely dispersed trivalent iron hydroxide in the form of a sol. The top of the container accommodates an air space 36 and a control device 37 which automatically releases the excessive air and keeps the liquid level at a predetermined height. The removal of the water from the tank is effected through a pressure conduit 38. The flocculated substances which collect at the bottom of the container may be removed from time to time; it is also possible to remove the inner container 33 from the tank 31, following removal of the cover 39.

I wish it to be understood that I do not desire to be limited to the exact details of design, construction, operation and details shown and described as modifications within the scope of the following claims, which would involve no departure from the spirit of the invention nor any sacrifice of the advantages thereof, may occur to persons working in this field.

I claim:
1. A plant for recovering water for general use from crude water having its natural content of oxygen and carbon dioxide and contaminated by other impurities which may include radioactive substances, comprising in combination a suction conduit adapted to extend into the crude water, and including sieve means for preventing coarse impurities from entering the plant;

a filtering tank directly connected with said conduit, and a mass of ferrous metal cuttings in said filtering tank;

a pump, a conduit connecting said pump with said filtering tank, and an air admission control valve disposed in said conduit, at a material distance from said filtering tank;

an oxidation tank protected from access of the ambient air, a conduit connecting said oxidation tank with said pump and means for removing excess air from the water and means for depositing floc from the water, arranged in said oxidation tank, and a layer filter protected from access of the ambient air, a conduit connecting said oxidation tank with said layer filter, said layer filter being adapted to retain and utilize as an auxiliary filtering medium, the finely dispersed ferric hydroxide sol contained in the water reaching said layer filter.

2. A plant according to claim 1, particularly adapted for the removal of radioactive impurities, comprising means for removing any remaining traces of radioactive substances, and a conduit connecting said means with the said layer filter.

3. A plant according to claim 1, wherein the layers of the layer filter are composed of a mixture of at least about 20 percent of asbestos, up to about 20 percent of diatomaceous earth, the balance being cellulose fibers.

4. In a plant according to claim 1, said oxidation tank, two concentric cup-shaped containers disposed in said tank and defining an outer annular inlet chamber, an intermediate annular oxidation chamber, and an interior separation and sedimentation chamber; said inlet chamber having a water supply conduit disposed in the bottom of said tank, and water discharge conduits in the form of openings on the side and near the top of the outer container; said oxidation chamber having its water supply conduits in the form of said openings, its water discharge conduit in the form of an opening in the bottom of the inner container, and outer and inner sidewalls corrugated to serve as trickling surfaces; and said separation and sedimentation chamber having a water supply conduit in the form of a vertical riser extending upward from said opening in the bottom of the inner container, a water discharge conduit extending from the lower portion of the separation and sedimentation chamber upward through the top of the tank, an air discharge conduit extending from the upper portion of said separation and sedimentation chamber upward through the top of said tank, and a float valve arranged on and controlling said air discharge conduit whereby to maintain the water in the interior of said separation and sedimentation chamber at a constant level.

References Cited in the file of this patent

UNITED STATES PATENTS

| 314,003 | Duffy | Mar. 17, 1885 |
| 513,686 | Scowden | Jan. 30, 1894 |
| 2,000,137 | Kelley | May 7, 1935 |
| 2,116,053 | Urbain et al. | May 3, 1938 |
| 2,029,487 | Wagner | July 30, 1940 |
| 2,216,844 | Kuhl | Oct. 8, 1940 |
| 2,413,375 | Pomeroy | Dec. 31, 1946 |
| 2,447,511 | Leaf | Aug. 24, 1948 |
| 2,783,894 | Lovall et al. | Mar. 5, 1957 |

OTHER REFERENCES

Membranfilter of Professor Zsigmody brochure (June 1956), Membranfilter-Gesellschaft, Sartorius-Werke A.G., Gottingen, page 7.

Morton et al.: "J. American Water Works Association," vol. 48, pages 545–558, May 1956.